H. W. MAY.
END GATE FASTENER.
APPLICATION FILED MAY 31, 1917.
1,257,625.
Patented Feb. 26, 1918.
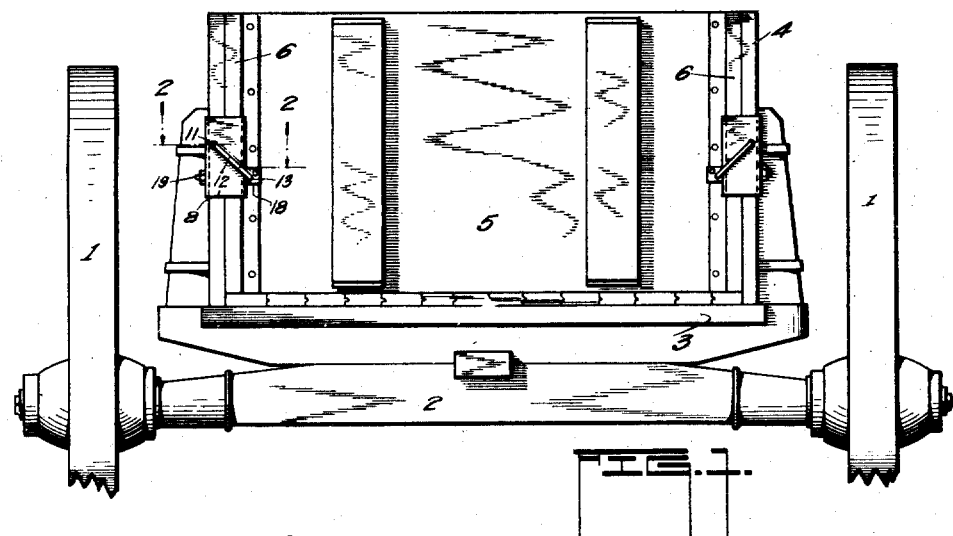
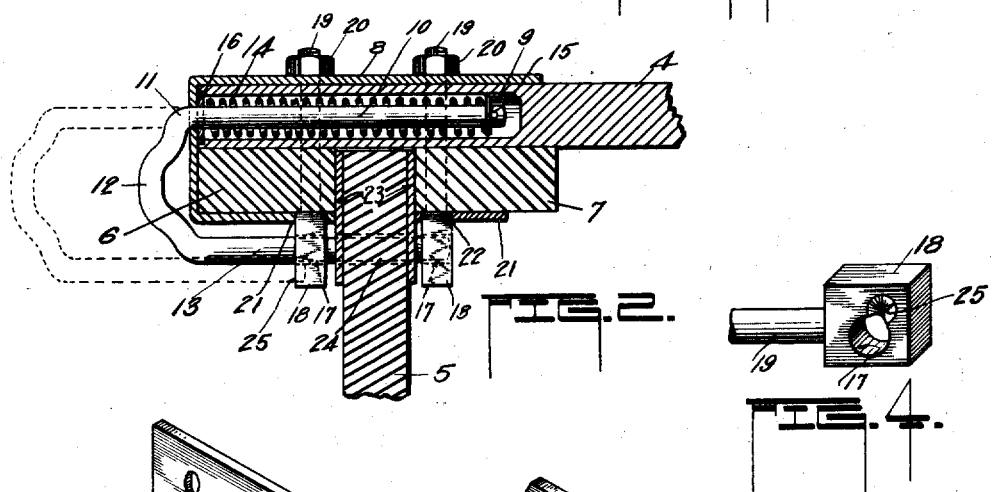
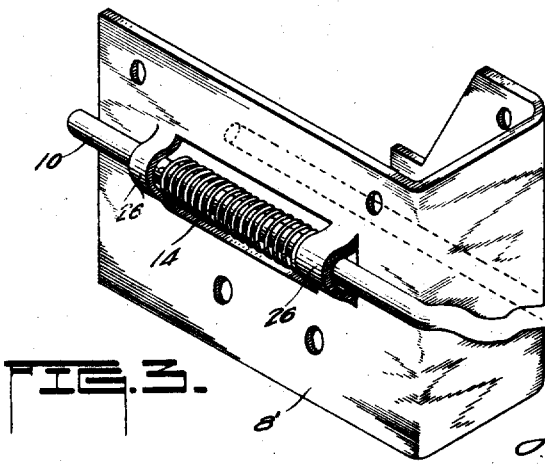
INVENTOR
Henry W. May
by
LaPate & Bean
ATT'YS

UNITED STATES PATENT OFFICE.

HENRY W. MAY, OF HENRY, ILLINOIS.

END-GATE FASTENER.

1,257,625.  Specification of Letters Patent.  Patented Feb. 26, 1918.

Application filed May 31, 1917. Serial No. 171,843.

*To all whom it may concern:*

Be it known that I, HENRY W. MAY, a citizen of the United States, a resident of Henry, in the county of Marshall and State of Illinois, have invented new and useful Improvements in End-Gate Fasteners, of which the following is a specification.

My invention relates to improvements in end-gate fastening devices and the principal object, is a device which may be readily applied to wagons as an attachment, and also may be furnished as a permanent part of the wagon, and which will securely lock and fasten the end-gate against movement in any direction, but which may also be readily unlocked to permit the removal of the end-gate for loading and unloading the wagon.

To the accomplishment of the foregoing and such other objects as may hereinafter appear, my invention consists in the combination, construction and arrangement of parts hereinafter described and then sought to be defined in the appended claims, reference being had to the accompanying drawing forming a part hereof, and which shows merely for the purpose of illustrative disclosure, two preferred embodiments of my invention, it being understood that various changes may be made in practice within the scope of the claims without digressing from my inventive idea.

In the drawings,

Figure 1 represents a rear end elevation of a portion of a wagon, with one form of my invention applied thereto;

Fig. 2. is a horizontal cross-section taken on line 2—2 of Fig. 1, the parts being shown on an enlarged scale, to facilitate disclosure; and Fig. 3 is a perspective view of a slightly different form of device embodying my invention.

Fig. 4 is a perspective view of a detail.

Referring now to the drawings, and particularly Fig. 1, the numeral 1 designates the wheels mounted on the axle 2 on which the usual wagon body 3 is supported, having the sides 4 and the end-gate 5 of usual construction. Mounted on the inside of the sides 4 near the rear end thereof, are the cleats 6 and 7, which are spaced apart to receive the end-gate 5, as is customary.

Referring now to Figs. 1 and 2, particularly, the numeral 8 designates the casing member which is of sheet metal of suitable character, and is arranged to embrace the end of the side member 4 and the end cleat 6, and forms a housing for the socket 9 which is provided within the end-portion of the side member 4. This socket is for the purpose of receiving one portion 10 of the substantially U-shaped locking element 11, having the curved handle portion 12, to facilitate operation, and having the locking portion or element 13. Embracing the part of the U-shaped member 11 within the socket, is the coil spring 14, bearing against the washer 15, at one end, and the washer 16 at the other end. Due to this construction, the locking member may be withdrawn to the dotted line position, and when released, will be moved to its locking position, due to the pressure of the spring. The locking portion or element 13 is arranged to pass through the apertures 17, in the square heads 18 of the bolts 19, which pass from the inside of the cleats 6 and 7 to the outside of the side member 4, and are provided with the nuts 20 for securing the housing on the wagon body. This housing 8 is provided with the square aperture 21 to receive the square head 18 of the bolt and prevent it from turning.

The supporting plate 21 is similarly provided with the square aperture 22 to receive the square head of the other bolt. The end-gate is preferably provided on each side at its ends with the plate members 23 and has the aperture 24 extending therethrough in line with the aperture 17 in the square heads of the bolts, so that when the end-gate is in closed position, the locking element will readily pass through the alined openings.

Attention is directed to the fact that the first square headed bolt is provided with the socket 25 adjacent its aperture to receive the end of the locking element to hold it in open or unlocked position, so that the operator, after releasing the locking means, can lift the end-gate.

Substantially the same construction is shown in Fig. 3, with the exception that the spring 14 and the element 10 of the U-shaped locking member, are mounted in the ears 26, struck up or otherwise formed on the housing member 8'. This construction is particularly designed for ready attachment to wagons, without the necessity of boring holes in the side members.

It is therefore seen that I have provided a construction which is exceedingly simple, easy to operate and efficient in holding the end-gate against removal, and which may be readily applied in use.

What I claim is:—

1. In combination, with a wagon body having a side member and spaced cleats and an end-gate adapted to be positioned between the cleats, a fastening device therefor, including a substantially U-shaped member having one arm provided with resilient means, and another arm arranged to pass through the end-gate to hold it in locked position, said resilient means normally holding the fastening device in locked position and the arms of said U-shaped member extending substantially parallel to the side member of the wagon body.

2. In combination, with a wagon body having a side member and spaced cleats and an end-gate adapted to be positioned between the cleats, a fastening device therefor, including a housing adapted to be mounted on the rear end of the wagon body and to embrace the end of the side member and the end cleat, a U-shaped locking member having one arm provided with a resilient means and the other arm serving as the lock, securing means for the housing said securing means each being provided with an aperture adapted to receive the locking element, which also passes through an opening in the end-gate.

3. A device of the character described, including in combination, a housing adapted to be mounted on the rear end of the side member of a wagon body, a U-shaped locking element mounted in said housing and having means for normally holding it in locked position, elements each having an aperture therethrough and adapted to be secured to the end cleats on the side member, said locking element being adapted to pass through said apertures, and an aperture in the end-gate for holding it in position.

4. A device of the character described, including in combination, a housing adapted to be mounted on the rear end of the side member of a wagon body, securing bolts for said housing having their heads apertured and positioned on each side of the end-gate, a U-shaped locking element mounted in said housing having means for normally holding it in locked position in said apertures, and in an aperture in the end-gate.

5. A device of the character described, including in combination, a housing adapted to be mounted on the rear end of the side member of a wagon body, securing bolts for said housing having their heads apertured and positioned on each side of the end-gate, a U-shaped locking element mounted in said housing having a spring on an arm to normally hold it in locking position, the other arm serving as the locking member and being adapted to pass through the apertures in the bolts and an alined aperture in the end-gate.

6. A device of the character described including in combination, a housing adapted to be mounted on the rear end of the side member of a wagon body and to embrace the side member and rear end cleat, square-headed securing bolts for said housing passing through the end cleats and side member, said heads having apertures therethrough, a U-shaped locking element mounted in said housing having a spring on an arm to normally hold it in locking position, the other arm serving as the locking member and being adapted to pass through the apertures in the bolts and an alined aperture in the end-gate.

7. A device of the character described including in combination, a housing adapted to be mounted on the rear end of the side member of a wagon body and to embrace the side member and rear end cleat, square-headed securing bolts for said housing passing through the end cleats and side member, said heads having apertures therethrough, a U-shaped locking element mounted in said housing having a spring on an arm to normally hold it in locking position, the other arm serving as the locking member and being adapted to pass through the apertures in the bolts and an alined aperture in the end-gate, a plate on the second cleat for one of the bolts, said housing and said plate having square apertures therethrough to receive the square heads of the bolts and hold them against rotation.

HENRY W. MAY.

Copies of this patent may be obtained for five cents each, by addressing the "Commissioner of Patents, Washington, D. C."